US007480720B2

(12) United States Patent
Chu et al.

(10) Patent No.: US 7,480,720 B2
(45) Date of Patent: Jan. 20, 2009

(54) METHOD AND SYSTEM FOR LOAD BALANCING SWITCH MODULES IN A SERVER SYSTEM AND A COMPUTER SYSTEM UTILIZING THE SAME

(75) Inventors: Simon C. Chu, Chapel Hill, NC (US); David B. Rhoades, Raleigh, NC (US); Gregory B. Pruett, Raleigh, NC (US); Richard A. Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/606,043

(22) Filed: Jun. 25, 2003

(65) Prior Publication Data

US 2004/0264398 A1    Dec. 30, 2004

(51) Int. Cl.
*G06F 13/00* (2006.01)
(52) U.S. Cl. ............... 709/226; 718/105; 709/203
(58) Field of Classification Search ............... 709/226, 709/203; 718/105, 104, 102
See application file for complete search history.

(56) References Cited

U.S. PATENT DOCUMENTS

| 5,325,529 | A | 6/1994 | Brown et al. |
| 5,860,002 | A | 1/1999 | Huang |
| 6,138,234 | A | 10/2000 | Lee et al. |
| 6,185,623 | B1 | 2/2001 | Bailey et al. |
| 6,292,890 | B1 | 9/2001 | Crisan |
| 6,330,715 | B1 | 12/2001 | Razzaghe-Ashrafi |
| 6,404,752 | B1 | 6/2002 | Allen, Jr. et al. |
| 6,460,120 | B1 | 10/2002 | Bass et al. |
| 6,490,677 | B1 | 12/2002 | Aguilar et al. |
| 6,505,084 | B2 | 1/2003 | Blumenstock |
| 6,601,101 | B1 * | 7/2003 | Lee et al. .................... 709/227 |

(Continued)

FOREIGN PATENT DOCUMENTS

JP    2001-518665 T2    10/2001

(Continued)

OTHER PUBLICATIONS

Warren, Michael S., et al., "High-Density Computing: A 240-Processor Beowulf in One Cubic Meter", Proceedings of the IEEE/ACM SC2002 Conference.

(Continued)

*Primary Examiner*—Kenneth R Coulter
(74) *Attorney, Agent, or Firm*—Sawyer Law Group LLP

(57) ABSTRACT

A method and system for load balancing switch modules in a server system and a computer system utilizing the same is disclosed. In a first aspect, the method comprises assigning each of a plurality of servers to a switch module of a plurality of switch modules, such that a number of servers assigned to each of the plurality of switch modules is substantially equal. In a second aspect, a computer system comprises a plurality of servers coupled to a plurality of switch modules, a management module, and a load balancing mechanism coupled to the management module, wherein the load balancing mechanism assigns each of the plurality of servers to a switch module of the plurality of switch modules, such that a number of servers assigned to each of the plurality of switch modules is substantially equal.

34 Claims, 8 Drawing Sheets

U.S. PATENT DOCUMENTS

| | | | |
|---|---|---|---|
| 6,826,613 B1* | 11/2004 | Wang et al. | 709/227 |
| 7,117,269 B2* | 10/2006 | Lu et al. | 709/238 |
| 7,213,065 B2* | 5/2007 | Watt | 709/223 |
| 2002/0194345 A1* | 12/2002 | Lu et al. | 709/227 |
| 2003/0126202 A1* | 7/2003 | Watt | 709/203 |

FOREIGN PATENT DOCUMENTS

WO      99/17217 A1      4/1999

OTHER PUBLICATIONS

Computopia Apr. 2003, pp. 074-081.

* cited by examiner

600

700

800

METHOD AND SYSTEM FOR LOAD BALANCING SWITCH MODULES IN A SERVER SYSTEM AND A COMPUTER SYSTEM UTILIZING THE SAME

FIELD OF THE INVENTION

The present invention relates generally to computer server systems and, more particularly, to a method and system for balancing the load on at least two switch modules in a server system.

BACKGROUND OF THE INVENTION

In today's environment, a computing system often includes several components, such as servers, hard drives, and other peripheral devices. These components are generally stored in racks. For a large company, the storage racks can number in the hundreds and occupy huge amounts of floor space. Also, because the components are generally free standing components, i.e., they are not integrated, resources such as floppy drives, keyboards and monitors, cannot be shared.

A system has been developed by International Business Machines Corp. of Armonk, N.Y., that bundles the computing system described above into a compact operational unit. The system is known as an IBM eServer BladeCenter.™ The BladeCenter is a 7U modular chassis that is capable of housing up to 14 individual server blades. A server blade or blade is a computer component that provides the processor, memory, hard disk storage and firmware of an industry standard server. Each blade can be "hot-plugged" into a slot in the chassis. The chassis also houses supporting resources such as power, switch, management and blower modules. Thus, the chassis allows the individual blades to share the supporting resources.

For redundancy purposes, two Ethernet Switch Modules (ESMs) are mounted in the chassis. The ESMs provide Ethernet switching capabilities to the blade server system. The primary purpose of each switch module is to provide Ethernet interconnectivity between the server blades, the management modules and the outside network infrastructure.

Typically when a blade performs a remote boot, e.g., via an external network, it selects a default ESM and initiates a remote boot sequence. While this process is adequate if only a few blades perform remote boots or if the blades perform remote boots at different times, it becomes unmanageable when several blades attempt to boot through the default ESM at roughly the same time. In this situation, the default ESM process creates an effective bottleneck at the default ESM and results in degraded performance.

Accordingly, a need exists for a system and method for balancing the load on at least two ESMs during remote booting. The system and method should not be static and should allow dynamic adjustment of the load depending on the ESM use. The present invention addresses such a need.

SUMMARY OF THE INVENTION

A method and system for load balancing switch modules in a server system and a computer system utilizing the same is disclosed. In a first aspect, the method comprises assigning each of a plurality of servers to a switch module of a plurality of switch modules, such that a number of servers assigned to each of the plurality of switch modules is substantially equal. In a second aspect, a computer system comprises a plurality of servers coupled to a plurality of switch modules, a management module, and a load balancing mechanism coupled to the management module, wherein the load balancing mechanism assigns each of the plurality of servers to a switch module of the plurality of switch modules, such that a number of servers assigned to each of the plurality of switch modules is substantially equal.

DETAILED DESCRIPTION

The present invention relates generally to server systems and, more particularly, to a method and system for balancing the load on at least two switch modules in a server system. The following description is presented to enable one of ordinary skill in the art to make and use the invention and is provided in the context of a patent application and its requirements. Although the preferred embodiment of the present invention will be described in the context of a BladeCenter, various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to a preferred embodiment of the present invention, a load balancing mechanism coupled to each of a plurality of servers oversees traffic flow between the servers and a plurality of switch modules, and controls the load each switch module carries. The load balancing mechanism accomplishes this by assigning to each server one ESM for use during a remote boot. By assigning an ESM to each server, as opposed to having the servers default to the same ESM, network access is more efficient and predictable.

Figure 1:
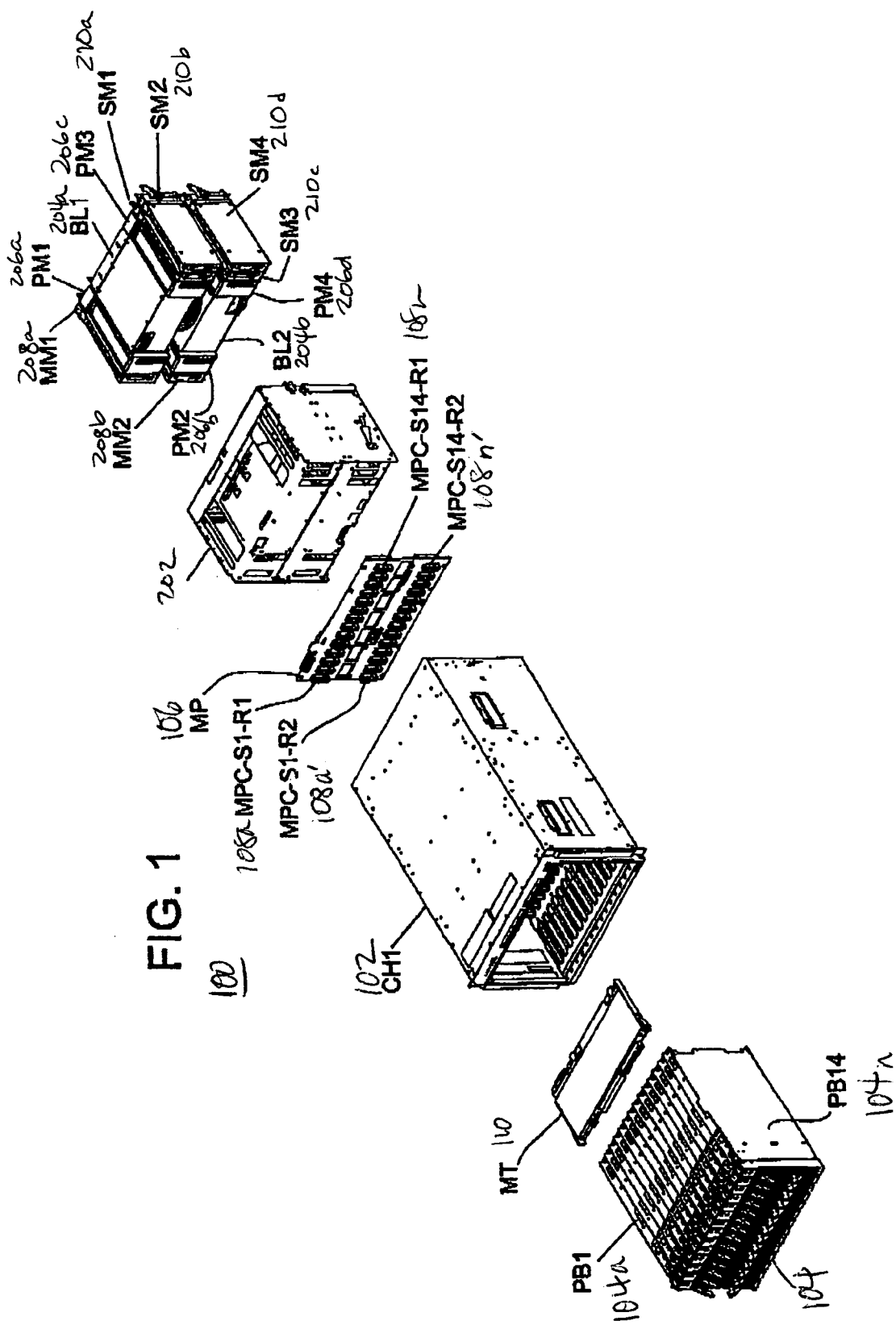
FIG. 1 is a perspective view illustrating the front portion of a BladeCenter.

To describe the features of the present invention, please refer to the following discussion and Figures, which describe a computer system, such as the BladeCenter, that can be utilized with the present invention. FIG. 1 is an exploded perspective view of the BladeCenter system 100. Referring to this figure, a main chassis 102 houses all the components of the system. Up to 14 server blades 104 (or other blades, such as storage blades) are plubbed into the 14 slots in the front of chassis 102. Blades 104 may be 'hot swapped' without affecting the operation of other blades 104 in the system 100. A server blade 104a can use any microprocessor technology so long as it is compliant with the mechanical and electrical interfaces, and the power and cooling requirements of the system 100.

A midplane circuit board 106 is positioned approximately in the middle of chassis 102 and includes two rows of connectors 108, 108'. Each one of the 14 slots includes one pair of midplane connectors, e.g., 108a, 108a', located one above the other, and each pair of midplane connectors, e.g., 108a, 108a' mates to a pair of connectors (not shown) at the rear edge of each server blade 104a.

Figure 2:
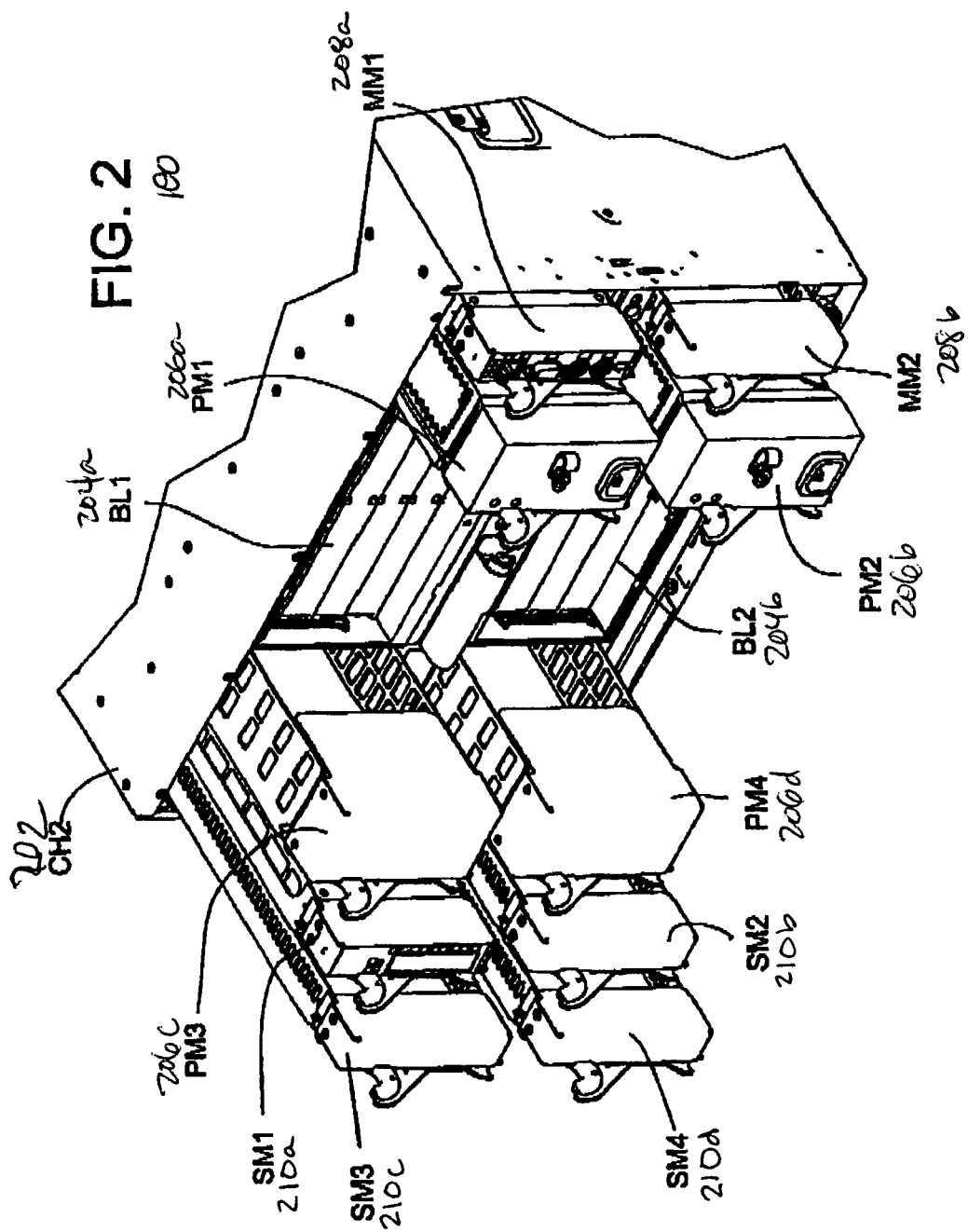
FIG. 2 is a perspective view of the rear portion of the BladeCenter.

FIG. 2 is a perspective view of the rear portion of the BladeCenter system 100, whereby similar components are identified with similar reference numerals. Referring to FIGS. 1 and 2, a second chassis 202 also houses various hot components for cooling, power, management and switching. The second chassis 202 slides and latches into the rear of main chassis 102.

As is shown in FIGS. 1 and 2, two optionally hot plugable blowers 204a, 204b provide cooling to the blade system components. Four optionally hot plugable power modules 206 provide power for the server blades and other components. Management modules MM1 and MM2 (208a, 208b) can be hot-plugable components that provide basic management functions such as controlling, monitoring, alerting, restarting and diagnostics. Management modules 208 also provide other functions required to manage shared resources, such as multiplexing the keyboard/video/mouse (KVM) to provide a local console for the individual blade servers 104 and configuring the system 100 and switching modules 210.

The management modules 208 communicate with all of the key components of the system 100 including the switch 210, power 206, and blower 204 modules as well as the blade servers 104 themselves. The management modules 208 detect the presence, absence, and condition of each of these components. When two management modules are installed, a first module, e.g., MM1 (208a), will assume the active management role, while the second module MM2 (208b) will serve as a standby module.

The second chassis 202 also houses up to four switching modules SM1 through SM4 (210a-210d). Generally, two Fiber Channel switch modules, e.g., SM1 (210a) and SM2 (210b), and two Ethernet switch modules, e.g., SM3 (210c) and SM4 (210d), are provided. Each switch module includes several external data ports (not shown) for connection to the external network infrastructure. Each switch module 210 is also coupled to each one of the blades 104. The primary purpose of the switch module 210 is to provide interconnectivity between the server blades (104a-104n), management modules (208a, 208b) and the outside network infrastructure. Depending on the application, the external interfaces may be configured to meet a variety of requirements for bandwidth and function.

Figure 3:
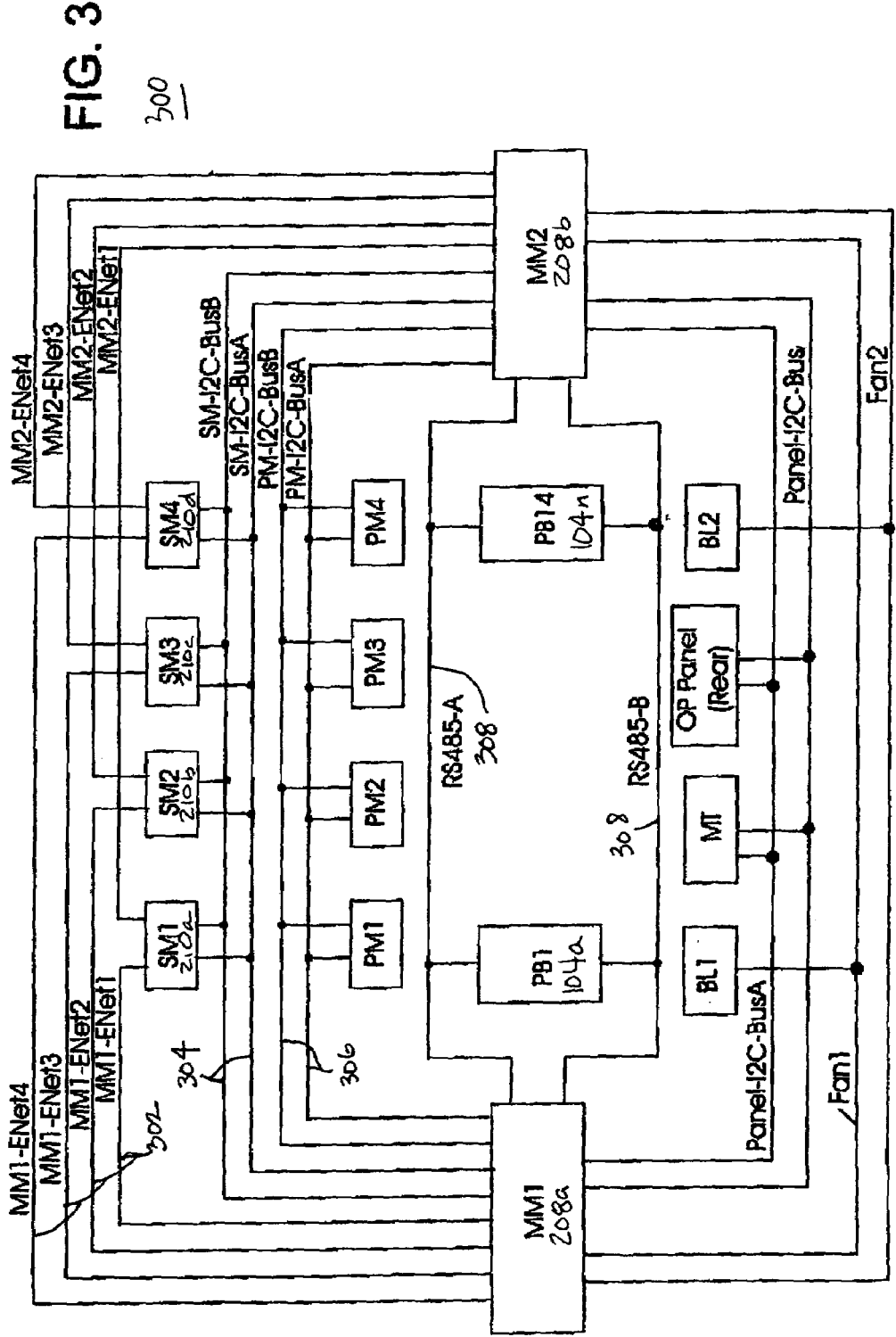
FIG. 3 is a schematic diagram of the server blade system's management subsystem.

FIG. 3 is a schematic diagram of the server blade system's management subsystem 300, where like components share like identifying numerals. Referring to this figure, each management module (208a, 208b) has a separate Ethernet link 302 to each one of the switch modules (210a-210d). This provides a secure high-speed communication path to each of the switch modules (210) for control and management purposes only. In addition, the management modules (208a, 208b) are coupled to the switch modules (210a-210d) via two well known serial I2C buses (304), which provide for "out-of-band" communication between the management modules (208a, 208b) and the switch modules (210a-210d). The I2C serial links 304 are used by the management module (208) to internally provide control of the switch module (210) and to collect system status and vendor product data ("VPD") information. The management modules (208a, 208b) are also coupled to the server blades (104a-104n) via two serial buses (308) for "out-of-band" communication between the management modules (208a, 208b) and the server blades (104a-104n).

Figure 4:
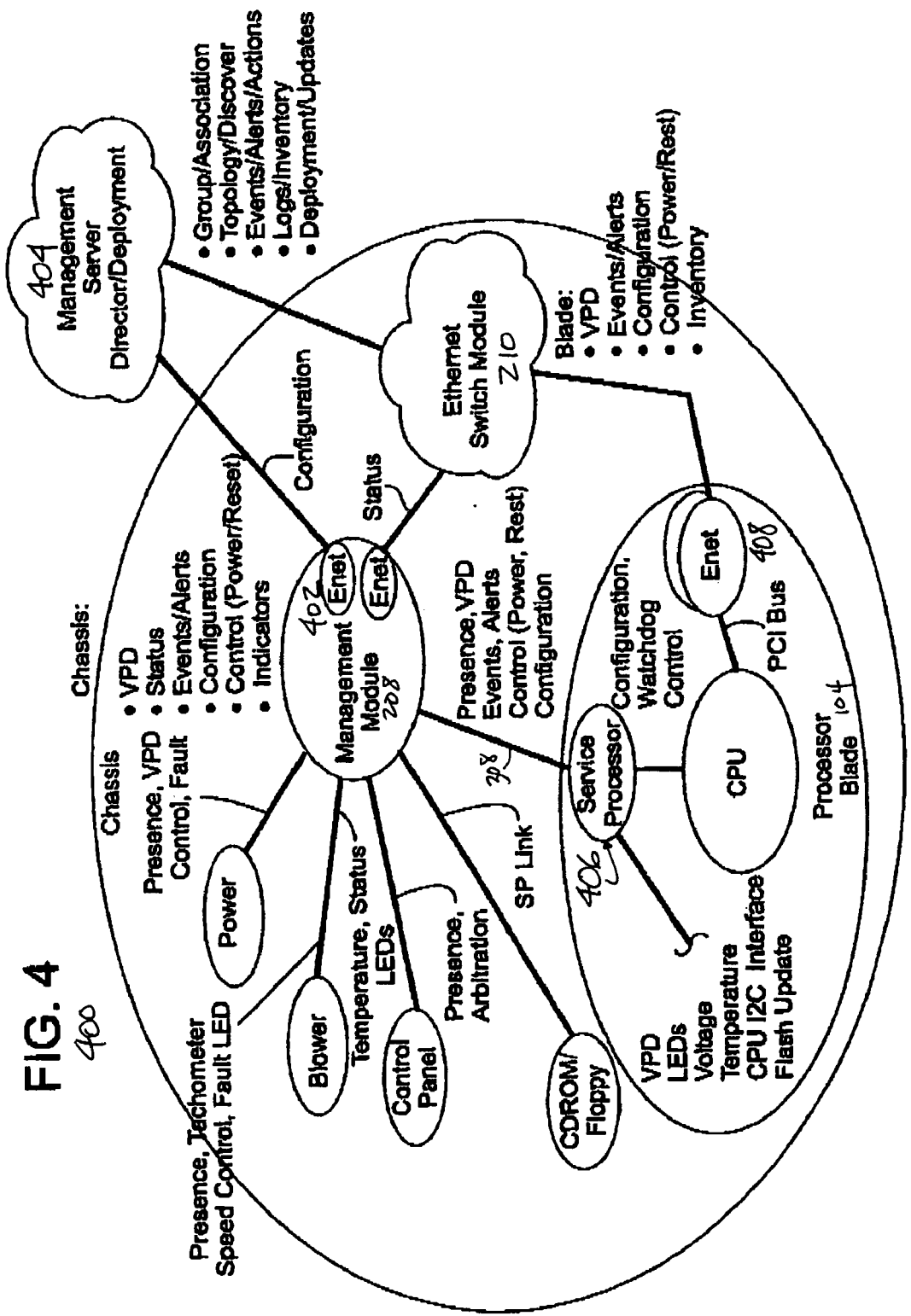
FIG. 4 is a topographical illustration of the server blade system's management functions.

FIG. 4 is a topographical illustration of the server blade system's management functions. Referring to FIGS. 3 and 4, the management module 208 communicates with each blade server 104 through a dedicated service processor 406 in each server blade 104. Such communications are conducted over the out-of-band serial bus 308, with one management module 208 acting as the master and the server blade's service processor 406 acting as a slave. As is shown in FIG. 4, the management module (208) also includes a port 402 that is intended to be attached to a private, secure management server 404. The management module firmware supports a web browser interface for either direct or remote access. The management module 208 can send alerts to the management server 404 to indicate changes in status, such as removal or addition of a blade 104 or module.

In general, each server blade 104 supports booting locally, e.g., from a CD-ROM or floppy disk drive mounted in the chassis 102 or from the blade's own hard disk drive. Booting is also supported remotely, i.e., from an external network. When performing a remote boot, the blade 104 selects a default Ethernet switch module (ESM), e.g., SM3 210c, and starts the remote boot sequence. Because each server blade 104 acts independently from the others, there exists the likelihood that several blades will attempt to perform a remote boot at roughly the same time using the same default ESM (210c). Because there currently is no mechanism to control switch module traffic, this causes a bottleneck at the ESM that results in degraded performance.

Figure 5:
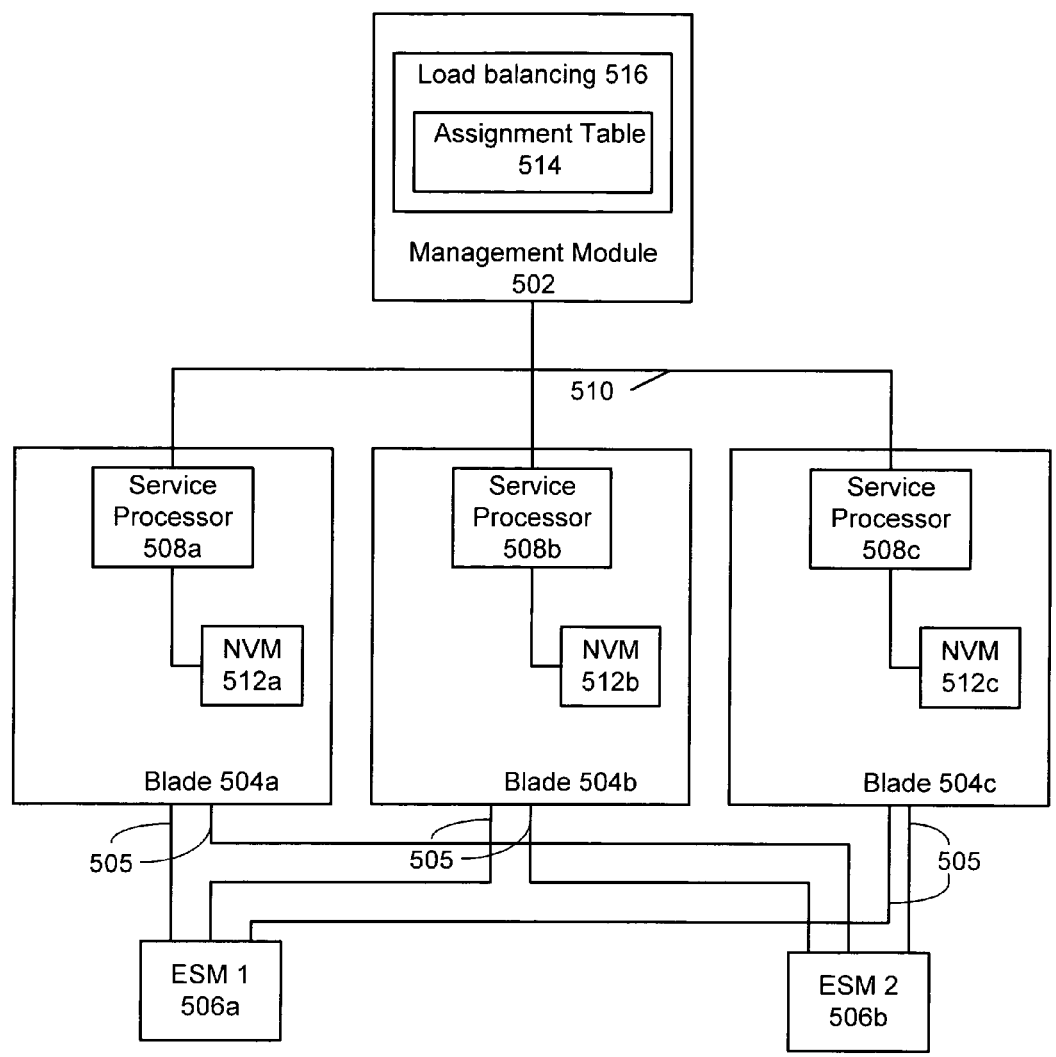
FIG. 5 is a schematic block diagram of the server blade system 500 according to a preferred embodiment of the present invention.

The present invention resolves this problem. Please refer now to FIG. 5, which is a schematic block diagram of the server blade system 500 according to a preferred embodiment of the present invention. For the sake of clarity, FIG. 5 depicts one management module 502, three blades 504a-504c, and two ESMs 506a, 506b. Nevertheless, it should be understood that the principles described below can apply to more than one management module, to more than three blades, and to more than two ESMs or other types of switch modules.

Each blade 504a-504c includes several internal ports 505 that couple it to each one of the ESMs 506a, 506b. Thus, each blade 504a-504c has access to each one of the ESMs 506a, 506b. In the preferred embodiment of the present invention, a load balancing mechanism 516 is coupled to each of the blades 504a-504c. In one embodiment, the load balancing mechanism 516 is in the management module 502 and therefore utilizes the "out-of-band" serial bus 510 to communicate with each of the blades 504a-504c through each blade's dedicated service processor 508a-508c. In another embodiment, the load balancing mechanism 516 could be a stand alone module coupled to the service processors 508a-508c. The load balancing mechanism 516 includes a switch assignment table 514, which includes load information for each of the ESMs 506a, 506b.

Each server blade 504a-504c includes non-volatile storage (NVS) 512a-512c, which is accessible by the associated service processor 508a-508c. The NVS 512a-512c can be any storage medium known in the art, such as storage on a hard file partition or non-volatile memory (CMOS).

In a preferred embodiment of the present invention, the load balancing mechanism 516 oversees the traffic flow between the blades 504a-504c and switch modules 506a, 506b and controls the load each switch module carries. The load balancing mechanism 516 accomplishes this by assigning to each server blade 504a-504c one of a plurality of ESMs 506a, 506b for use during a remote boot. By assigning an ESM, e.g., 506a, to each blade, e.g., 504a, as opposed to having the blades default to the same ESM, network access is more efficient and predictable.

Figure 6:
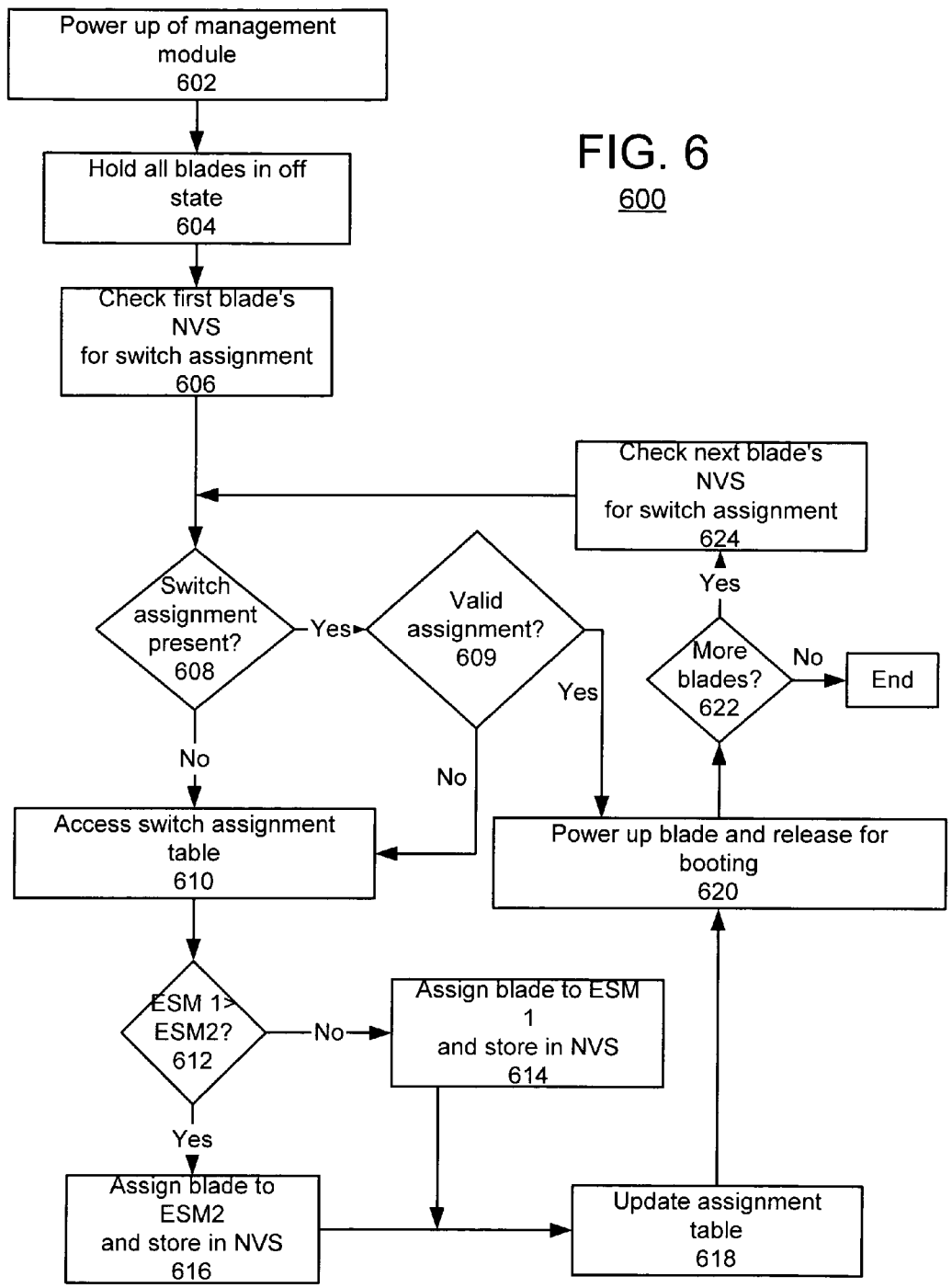
FIG. 6 is a flowchart illustrating a process by which the management module assigns each blade to an ESM according to a preferred embodiment of the present invention.

FIG. 6 is a flowchart illustrating a process by which the load balancing mechanism 516 assigns each blade 504a-504c to an ESM 506a, 506b according to a preferred embodiment of the present invention. The process 600 starts at the initial power up sequence of the computer system, i.e., when the management module 502 is powered up (via step 602). The management module 502 holds all of the blades 508a-508c in a powered off state (step 604) and later powers up each blade 508a-508c after it has been processed, as follows.

In step 606, the load balancing mechanism 516 checks a first blade's, e.g., 504a, non-volatile storage (NVS) 512a to determine whether it has an existing switch assignment (step 608). For instance, the blade 504a would have an existing assignment if it had been plugged into another chassis previously and received a switch assignment from that load balancing mechanism. If a switch assignment is not detected in step 608, then the load balancing mechanism 516 accesses the switch assignment table 514 (FIG. 5), via step 610. In a preferred embodiment, the assignment table 514 includes information about the number of blades and which blades are assigned to each ESM 506a, 506b.

In step 612, the load balancing mechanism 516 compares the number of blades, if any, assigned to each ESM 506a, 506b. If the number of blades assigned to ESM1 506a is greater than the number of blades assigned to ESM2 506b, then the load balancing mechanism 516 will assign ESM2 506b to the first blade 504a and store that assignment in the first blade's NVS 512a, via step 616. On the other hand, if the number of blades assigned to ESM1 506a is less than or equal to the number of blades assigned to ESM2 506b, then the load balancing mechanism 516 will assign ESM1 506a to the first blade 504a and store that assignment in the first blade's NVS 512a, via step 614. While the assignment process is described in the context of two ESMs 506a, 506b, the process can be extended to apply to more than two ESMs.

As stated above, if a switch assignment is not present in the blade's NVS 512a, then one is generated by the load balancing mechanism 516 (steps 610-616). If, however, a switch assignment is present, the load balancing mechanism 516 must determine whether the assignment is valid, i.e., not generated by another load balancing mechanism, in step 609. In one preferred embodiment, the load balancing mechanism 516 will access the switch assignment table 514 and if the existing switch assignment fails to match an entry in the table 514, the existing switch assignment will be erased and a new switch assignment will be generated (steps 610-616).

In another preferred embodiment, the load balancing mechanism 516 will store in the NVS 512a a management module identifier along with the switch assignment to indicate that the assignment is associated with this particular management module 502. The identifier can be any alphanumeric string uniquely identifying the management module 502, such as its serial number. Thus, the next time the management module 502 powers up and the load balancing mechanism 516 checks the blade's NVS 512a for a switch assignment (steps 602-606), the load balancing mechanism 516 will conclude that such an assignment is valid if the identifier matches the management module's 502 identifier, and instruct the management module 502 to power up the blade 504a and release it for booting (step 620). If, however, the identifier does not match the management module's 502 identifier, e.g., it was removed and reinserted between power up, the load balancing mechanism 516 will erase the existing switch assignment and identifier and proceed to assign an ESM 506a, 506b to the blade 504a via steps 610 through 616.

After the load balancing mechanism 516 has stored the switch assignment in the first blade 504a, it updates the assignment table 514 to reflect the latest assignment in step 618. Next, the management module 502 powers up the blade 504a and releases it for booting in step 620. If more blades must be processed (determined in step 622), the load balancing mechanism 516 goes to the next blade, e.g., 504b, and checks its NVS for a switch assignment in step 624. The process loops through steps 608 through 622 until each of the blades 504a-504c has been processed and powered up. In the end, each of the blades 504a-504c has a switch assignment stored in its respective NVS 512a-512c and each blade is powered up and released for booting.

In a preferred embodiment, the management module 502 assigns a switch ID or enumeration, e.g., an Advanced Configuration and Power Interface (ACPI) enumeration, to each blade 504a-504c to achieve an intelligent and efficient boot procedure for all of the blades. To control this intelligent network access scheme for each blade 504a-504c, the management module 502 writes the enumeration into the NVS 512a-512c of each of the blades 504a-504c, thus maintaining a persistent boot control code indicator on each of the blades 504a-504c. When an individual blade, e.g., 504a, boots, it will access the boot control code indicator from its NVS 512a and perform its remote boot from the assigned ESM autonomously.

Figure 7:
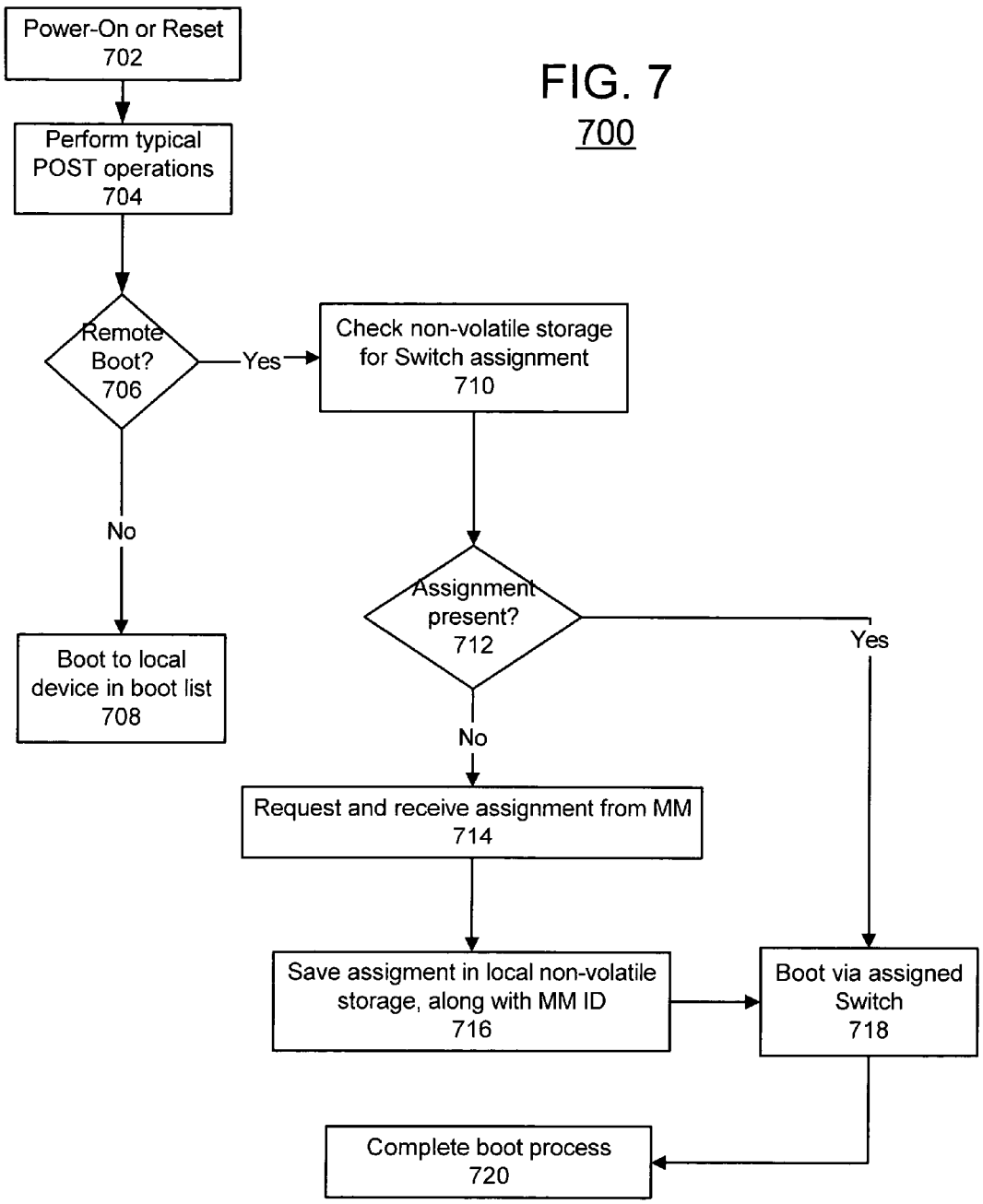
FIG. 7 is a flowchart illustrating a blade boot process according to a preferred embodiment of the present invention.

FIG. 7 is a flowchart illustrating a blade boot process 700 according to a preferred embodiment of the present invention. The process begins at step 702 when the server blade, e.g., 504a, is powered-on or reset. In step 704, the blade 504a performs typical POST operations. During the POST sequence, the blade 504a determines whether a remote boot will be performed in step 706. If not, the blade 504a boots from a local device, e.g., CD-ROM, FDD, or hard disk, in a boot list in step 708.

If a remote boot is performed, the blade 504a invokes the boot control code and checks its NVS 512a for a switch assignment in step 710. If an assignment is present (as determined in step 712), the blade 504a will remote boot via the assigned switch in step 718. If, on the other hand, an assignment is not present, e.g., because the blade 504a was inserted between system power-on's or resets, the blade 504a will request and receive a switch assignment from the load balancing mechanism 516 in step 714. The process by which the load balancing mechanism 516 generates the switch assignment mirrors that described in FIG. 6 in steps 610-616.

Once the blade 504a receives a switch assignment in step 714, the switch assignment and the management module's identifier are stored in the blade's local NVS 512a in step 716. The blade 504a now boots via its assigned switch in step 718, and the boot process proceeds to completion in step 720.

FIGS. 6 and 7 above describe two situations in which the load balancing mechanism 516 generates a switch assignment, the first is when the management module 502 is powered on or reset and the second is when a blade 504a directly requests such an assignment. According to a preferred embodiment of the present invention, the load balancing mechanism 516 can also be prompted to generate a switch assignment in at least two additional scenarios. The first scenario involves the insertion of a new blade, e.g., 504c, into the chassis. Because the management module 502 automatically detects an insertion event, it will hold the new blade 504c in an off state until the load balancing mechanism 516 has had the opportunity to check for a switch assignment in the new blade's NVS 512c and to generate an assignment if needed (process steps 606-620 in FIG. 6).

The second scenario involves the removal of a blade, e.g., 504b, from the chassis. In this situation, the removal of a blade 504a may cause an imbalance in the load assignments for the ESMs 506a, 506b. According to the preferred embodiment of the present invention, the load balancing mechanism 516 determines whether the load must be adjusted and does so autonomously.

Figure 8:
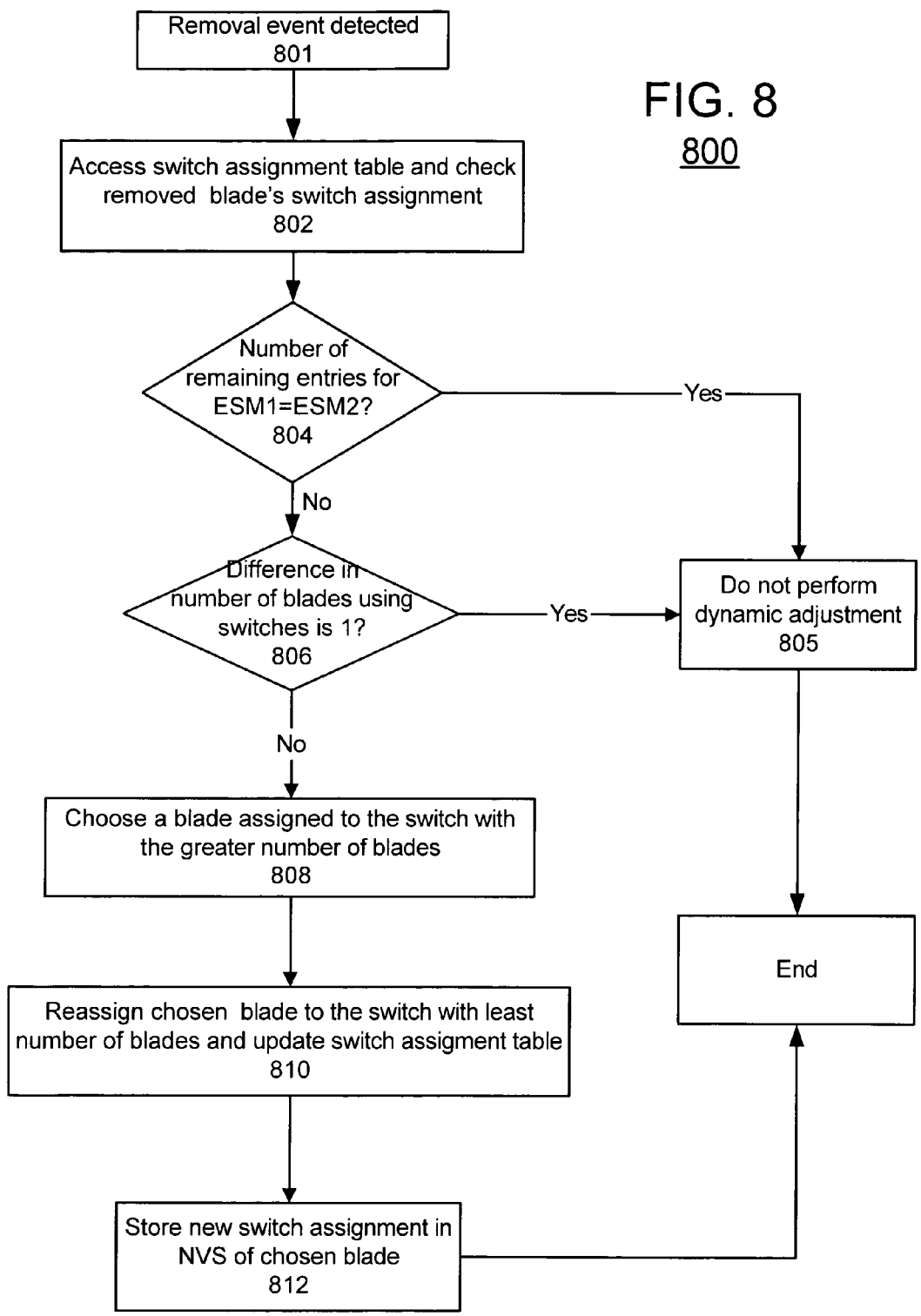
FIG. 8 is a flowchart for dynamically adjusting the load balance among a plurality of ESMs according to the preferred embodiment of the present invention.

To describe this process further, please refer now to FIG. 8, which is a flowchart for dynamically adjusting the load balance among a plurality of ESMs according to the preferred embodiment of the present invention. The process 800 begins when the management module 502 detects that a blade has been removed in step 801. In step 802, the load balancing mechanism 516 accesses its switch assignment table 514 and determines to which ESM 506a, 506b the removed blade was assigned. Then, the load balancing mechanism 516 compares the number of remaining entries for ESM1 506a to the number of remaining entries for ESM2 506b, whereby each entry represents a blade that is assigned to an ESM 506a, 506b.

If the number of remaining entries for ESM1 and ESM2 are equal (determined in step 804), the loads are balanced and load adjustment is not required (step 805). If the number of remaining entries for one of the ESMs, e.g., 506a, differs from the number of remaining entries for the other of the ESMs, e.g., 506b, by a single entry, then load adjustment will not be performed (step 805). Otherwise, the load balancing mechanism 516 dynamically adjusts the load among the ESMs 506a, 506b.

Assume ESM1 506a has six (6) remaining entries, including an entry representing blade 504c, and ESM2 506b has four (4) remaining entries. According to the preferred embodiment of the present invention, the load balancing mechanism 516 chooses a blade, e.g., 504c, assigned to the ESM with the greater number of entries, e.g., ESM1 506a, (in step 808), reassigns the chosen blade 504c to the ESM with the fewer number of entries, e.g., ESM2 506b, and updates the switch assignment table 514 accordingly in step 810. Finally, the new switch assignment is stored in the chosen blade's NVS 512c in step 812.

Through aspects of the present invention, the load balancing mechanism 516 evenly distributes the load among a plurality of ESMs 506a, 506b during the remote boot process. Accordingly, remote booting is more efficient and boot time is minimized when multiple blades 504a-504c are booting simultaneously. Although the preferred embodiment of the present invention has been described in an environment with only two ESMs 506a, 506b, those skilled in the art would readily appreciate that the same principles and processes would apply in an environment with more than two ESMs 506a, 506b.

While the preferred embodiment of the present invention has been described in the context of a BladeCenter environment, the functionality of the load balancing mechanism 516 could be implemented in any computer environment where the servers are closely coupled. Thus, although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented in hardware for load balancing a remote booting process for a plurality of switch modules in a server system, the server system including a plurality of servers, the method comprising:
   a) assigning each of the plurality of servers to a switch module of the plurality of switch modules, such that a number of servers assigned to each of the plurality of switch modules is substantially equal, a server accessing the switch module during a remote boot;
   a') storing a switch assignment; and
   (a1) determining whether a server must be assigned to a switch module by examining the server's non-volatile storage;
   (a2) accessing a switch assignment table to determine which of the plurality of switch modules to assign to the server if the server must be assigned; and
      wherein the accessing step comprises (a2i) utilizing the switch assignment table to evaluate a present load distribution across the plurality of switch modules, and (a2ii) assigning the server to the next switch module if the number of servers assigned to a current switch module is greater than the number of servers assigned to a next switch module;
   b) storing for each server a switch assignment in the server's non-volatile storage, wherein the switch assignment identifies the assigned switch module.

2. The method of claim 1, wherein the determining step (a1) further comprising:
   (a1i) concluding that the server must be assigned if the non-volatile storage does not include a switch assignment; else
   (a1ii) determining whether an existing switch assignment is valid if a switch assignment is found in the non-volatile storage; and
   (a1iii) concluding that the server must be assigned if the existing switch assignment is invalid.

3. The method of claim 1, wherein the switch assignment table includes information related to each of the switch modules and the servers assigned.

4. The method of claim 1, wherein the accessing step (a2) further comprising:
   (a2iii) assigning the server to the current switch module if the number of servers assigned to the current switch module is not greater than that assigned to the next switch module; else
   (a2iv) assigning the server to the current switch module if the number of servers assigned to the current switch module is equal to that assigned to the next switch module and the next switch module is a last switch module; else
   (a2v) repeating steps (a2ii) through (a2v) if the number of servers assigned to the current switch module is equal to that assigned to the next switch module and the next switch module is not a last switch module, wherein the next switch module becomes the current switch module.

5. The method of claim 1, wherein the assigning step (a) further comprising:
   (a3) updating the switch assignment table.

6. The method of claim 1 further comprising the step of:
   (c) utilizing the assigned switch module for access to a network.

7. The method of claim 6, wherein the utilizing step (c) further comprising:
   (c1) examining the server's non-volatile storage during a remote boot process to determine whether a switch assignment is present;

(c2) requesting, receiving and storing a new switch assignment if the switch assignment is not present; and
(c3) booting via the assigned switch.

8. The method of claim 1, wherein the assigning step (a) is performed during a system power up sequence and when a new server is added to the plurality of servers.

9. A computer readable medium implemented in hardware containing program instructions for load balancing a remote booting process for a plurality of switch modules in a server system, the server system including a plurality of servers, the instructions for:
   a) assigning each of the plurality of servers to a switch module of the plurality of switch modules, such that a number of servers assigned to each of the plurality of switch modules is substantially equal, a server accessing the switch during a remote boot;
   a') storing a switch assignment; and
   (a1) determining whether a server must be assigned to a switch module by examining the server's non-volatile storage;
   (a2) wherein the assigning instruction comprises accessing a switch assignment table to determine which of the plurality of switch modules to assign to the server if the server must be assigned; and
      wherein the accessing instruction comprises (a2i) utilizing the switch assignment table to evaluate a present load distribution across the plurality of switch modules, and (a2ii) assigning the server to the next switch module if the number of servers assigned to a current switch module is greater than the number of servers assigned to a next switch module;
   b) storing for each server a switch assignment in the server's non-volatile storage, wherein the switch assignment identifies the assigned switch module.

10. The computer readable medium of claim 9, wherein the determining instruction (a1) further comprising:
   (a1i) concluding that the server must be assigned if the non-volatile storage does not include a switch assignment; else
   (a1ii) determining whether an existing switch assignment is valid if a switch assignment is found in the non-volatile storage; and
   (a1iii) concluding that the server must be assigned if the existing switch assignment is invalid.

11. The method of claim 9, wherein the switch assignment table includes information related to each of the switch modules and the servers assigned thereto.

12. The computer readable medium of claim 9, wherein the accessing instruction (a2) further comprising:
   (a2iii) assigning the server to the current switch module if the number of 20 servers assigned to the current switch module is not greater than that assigned to the next switch module; else
   (a2iv) assigning the server to the current switch module if the number of servers assigned to the current switch module is equal to that assigned to the next switch module and the next switch module is a last switch module; else
   (a2v) repeating instructions (a2ii) through (a2v) if the number of servers assigned to the current switch module is equal to that assigned to the next switch module and the next switch module is not a last switch module, wherein the next switch module becomes the current switch module.

13. The computer readable medium of claim 9, wherein the assigning instruction (a) further comprising:
   (a3) updating the switch assignment table.

14. The computer readable medium of claim 9 further comprising the instruction for:
   (c) utilizing the assigned switch module for access to a network.

15. The computer readable medium of claim 14, wherein the utilizing instruction (c) further comprising:
   (c1) examining the server's non-volatile storage during a remote boot process to determine whether a switch assignment is present;
   (c2) requesting, receiving and storing a new switch assignment if the switch assignment is not present; and
   (c3) booting via the assigned switch.

16. The computer readable medium of claim 9, wherein the assigning instruction (a) is performed during a system power up sequence and when a new server is added to the plurality of servers.

17. A system implemented in hardware for load balancing a remote booting process for a plurality of switch modules in a server system, the server system including a plurality of servers, the system comprising:
   a load balancing mechanism coupled to each of the plurality of servers, wherein the load balancing mechanism assigns each of the plurality of servers to a switch module of the plurality of switch modules, such that a number of servers assigned to each of the plurality of switch modules is substantially equal, a server accessing the switch during a remote boot;
   means for storing a switch assignment;
   means for storing for each server a switch assignment in the Server's non-volatile storage, wherein the switch assignment identifies the assigned switch module;
   means for determining whether a server must be assigned to a switch module by examining the server's non-volatile storage;
   wherein the assigning means comprises means for accessing a switch assignment table to determine which of the plurality of switch modules to assign to the server if the server must be assigned; and
   wherein the accessing means comprises means for utilizing the switch assignment table to evaluate a present load distribution across the plurality of switch modules, and means for assigning the server to the next switch module if the number of servers assigned to a current switch module is greater than the number of servers assigned to a next switch module.

18. The system of claim 17, wherein each server comprising:
   means for storing a switch assignment in each server's non-volatile storage, wherein the switch assignment identifies the assigned switch module; and
   means for utilizing the assigned switch module for access to a network.

19. The system of claim 18, wherein the means for utilizing comprising:
   means for examining the server's non-volatile storage to determine whether a switch assignment is present,
   means for requesting, receiving and storing a new switch assignment if one is not present, and
   means for obtaining network access via the assigned switch.

20. The system of claim 18, wherein the load balancing mechanism comprises a switch assignment table, wherein the switch assignment table includes information related to each of the switch modules and the number of servers assigned thereto.

21. The system of claim 20, wherein the load balancing mechanism accesses the switch assignment table to determine which of the plurality of switch modules to assign to a server if such an assignment is required.

22. The system of claim 20, wherein the load balancing mechanism further comprises means for examining a server's non-volatile storage to determine whether the server requires an assignment to a switch module.

23. The system of claim 20, wherein the load balancing mechanism further comprises means for updating the switch assignment table after a server has been assigned to a switch module.

24. A computer system for load balancing a remote booting process comprising:
 a plurality of servers;
 a plurality of switch modules coupled to the plurality of servers;
 a management module coupled to each of the plurality of servers;
 a load balancing mechanism coupled to the management module, wherein the load balancing mechanism assigns each of the plurality of servers to a switch module of the plurality of switch modules, such that a number of servers assigned to each of the plurality of switch modules is substantially equal, a server accessing the switch during a remote boot;
 means for storing for each server a switch assignment in the server's non-volatile storage, wherein the switch assignment identifies the assigned switch module;
 means for determining whether a server must be assigned to a switch module by examining the server's non-volatile storage;
 the assigning means comprises accessing a switch assignment table to determine which of the plurality of switch modules to assign to the server if the server must be assigned; and
 wherein the accessing means comprises means utilizing the switch assignment table to evaluate a present load distribution across the plurality of switch modules, and means for assigning the server to the next switch module if the number of servers assigned to a current switch module is greater than the number of servers assigned to a next switch module.

25. The system of claim 24, wherein each server comprising:
 means for storing a switch assignment and a management module identifier in each server's non-volatile storage, wherein the switch assignment identifies the assigned switch module; and
 means for utilizing the assigned switch module for access to a network.

26. The system of claim 25, wherein the load balancing mechanism comprises a switch assignment table, wherein the switch assignment table includes information related to each of the switch modules and the servers assigned thereto.

27. The system of claim 26, wherein the load balancing mechanism further comprises means for examining a server's non-volatile storage to determine whether the server requires an assignment to a switch module.

28. The system of claim 26, wherein the load balancing mechanism further comprises means for updating the switch assignment table after a server has been assigned to a switch module.

29. A method implemented in hardware for load balancing a remote booting process a plurality of switch modules in a server system comprising a plurality of servers comprising the steps of:
 a) assigning each of the plurality of servers to a switch module of the plurality of switch modules, such that a number of servers assigned to each of the plurality of switch modules is substantially equal, a server accessing the switch during a remote boot;
 b) detecting that one of the plurality of servers has been removed;
 c) if needed, adjusting the load over the plurality of switch modules such that the number of remaining servers assigned to each of the plurality of switch modules is substantially equal; and
 d) storing for each server a switch assignment in the server's non-volatile storage, wherein the switch assignment identifies the assigned switch module;
 e) determining whether a server must be assigned to a switch module by examining the server's non-volatile storage;
 f) wherein the assigning step comprises accessing a switch assignment table to determine which of the plurality of switch modules to assign to the server if the server must be assigned; and
 wherein the accessing step comprises (f1) utilizing the switch assignment table to evaluate a present load distribution across the plurality of switch modules, and (f2) assigning the server to the next switch module if the number of servers assigned to a current switch module is greater than the number of servers assigned to a next switch module.

30. The method of claim 29, wherein the adjusting step (c) further comprising:
 (c1) accessing a switch assignment table, the switch assignment table including information related to each of the switch modules and the servers assigned thereto;
 (c2) comparing the number of remaining servers assigned to each of the plurality of switch modules; and
 (c3) based on the comparison, adjusting the load.

31. The method of claim 30, wherein the adjusting step (c3) further comprising:
 (c3i) maintaining the load if the number of remaining servers assigned to each of the switch modules is equal, or if the number of remaining servers assigned to each of the switch modules differ by one; else
 (c3ii) identifying a switch module having a highest number of servers assigned thereto and choosing a server assigned thereto; and
 (c3iii) identifying a switch module having a least number of servers assigned thereto and reassigning the chosen server thereto.

32. A computer readable medium implemented in hardware containing program instructions for load balancing a remote booting process a plurality of switch modules in a server system comprising a plurality of servers, instructions for:
 a) assigning each of the plurality of servers to a switch module of the plurality of switch modules, such that a number of servers assigned to each of the plurality of switch modules is substantially equal;
 b) detecting that one of the plurality of servers has been removed;
 c) if needed, adjusting the load over the plurality of switch modules such that the number of remaining servers assigned to each of the plurality of switch modules is substantially equal;
 d) storing for each server a switch assignment in the server's non-volatile storage, wherein the switch assignment identifies the assigned switch module;
 e) determining whether a server must be assigned to a switch module by examining the server's non-volatile storage;

f) wherein the assigning instruction comprises accessing a switch assignment table to determine which of the plurality of switch modules to assign to the server if the server must be assigned; and wherein the accessing instruction comprises (f1) utilizing the switch assignment table to evaluate a present load distribution across the plurality of switch modules, and (f2) assigning the server to the next switch module if the number of servers assigned to a current switch module is greater than the number of servers assigned to a next switch module.

33. The computer readable medium of claim 32, wherein the adjusting instruction (c) further comprising:

(c1) accessing a switch assignment table, the switch assignment table including information related to each of the switch modules and the servers assigned thereto;

(c2) comparing the number of remaining servers assigned to each of the plurality of switch modules; and (c3) based on the comparison, adjusting the load.

34. The computer readable medium of claim 33, wherein the adjusting instruction (c3) further comprising:

(c3i) maintaining the load if the number of remaining servers assigned to each of the switch modules is equal, or if the number of remaining servers assigned to each of the switch modules differ by one; else (c3ii) identifying a switch module having a highest number of servers assigned thereto and choosing a server assigned thereto; and (c3iii) identifying a switch module having a least number of servers assigned thereto and reassigning the chosen server thereto.

* * * * *